INVENTOR
LUCIEN DEVAUX
BY Robert Harding Jr.
ATTORNEY

June 27, 1950 L. DEVAUX 2,512,613

SELECTIVE CALL SYSTEM

Filed July 25, 1947 2 Sheets-Sheet 2

INVENTOR
LUCIEN DEVAUX
BY Robert Harding Jr.
ATTORNEY

Patented June 27, 1950 2,512,613

UNITED STATES PATENT OFFICE 2,512,613

SELECTIVE CALL SYSTEM

Lucien Devaux, Paris, France, assignor to International Standard Electric Corporation, New York, N. Y., a corporation of Delaware Application July 25, 1947, Serial No. 763,638
In France September 1, 1945

Section 1, Public Law 690, August 8, 1946
Patent expires September 1, 1965

9 Claims. (Cl. 250—6)

The present invention relates to selective call devices, e. g. between radiotelephone transmitting and receiving stations.

Given a group of radiotelephone stations, each consisting of a transmitter and a receiver, that have to communicate with each other, the object of the present invention is an apparatus to be associated to each station for the purpose of selectively calling any other station and conversing with it without possibility of interference from the other stations.

Since several conversations have to be exchanged simultaneously between the various stations of the group, it is necessary for several wavelengths to be provided and for the receiving and transmitting apparatuses to be provided with devices for the immediate adjustment of the wavelength, these devices being actuated, for example, by means of push buttons in a well known manner.

The present invention has as its object the reduction to a minimum of the operations necessary for establishing an intercommunication, and the exclusive use of members of a type regularly employed in the art of telephony. The description will be confined to that of the electric diagram, since selectors, relays, key switches, calling dials, etc. of any type may be used in the construction.

Figure 1A:
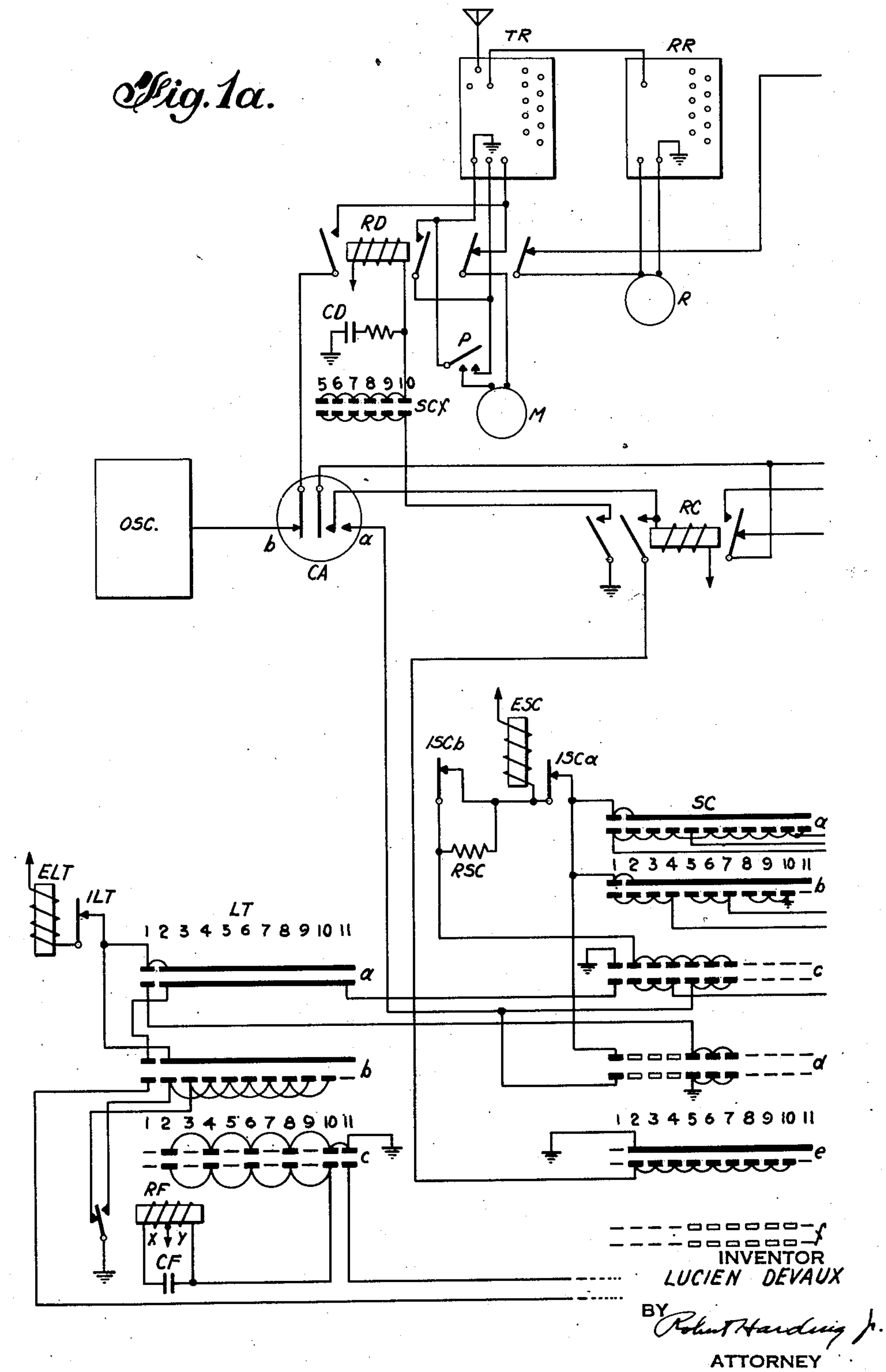
Figure 1B:
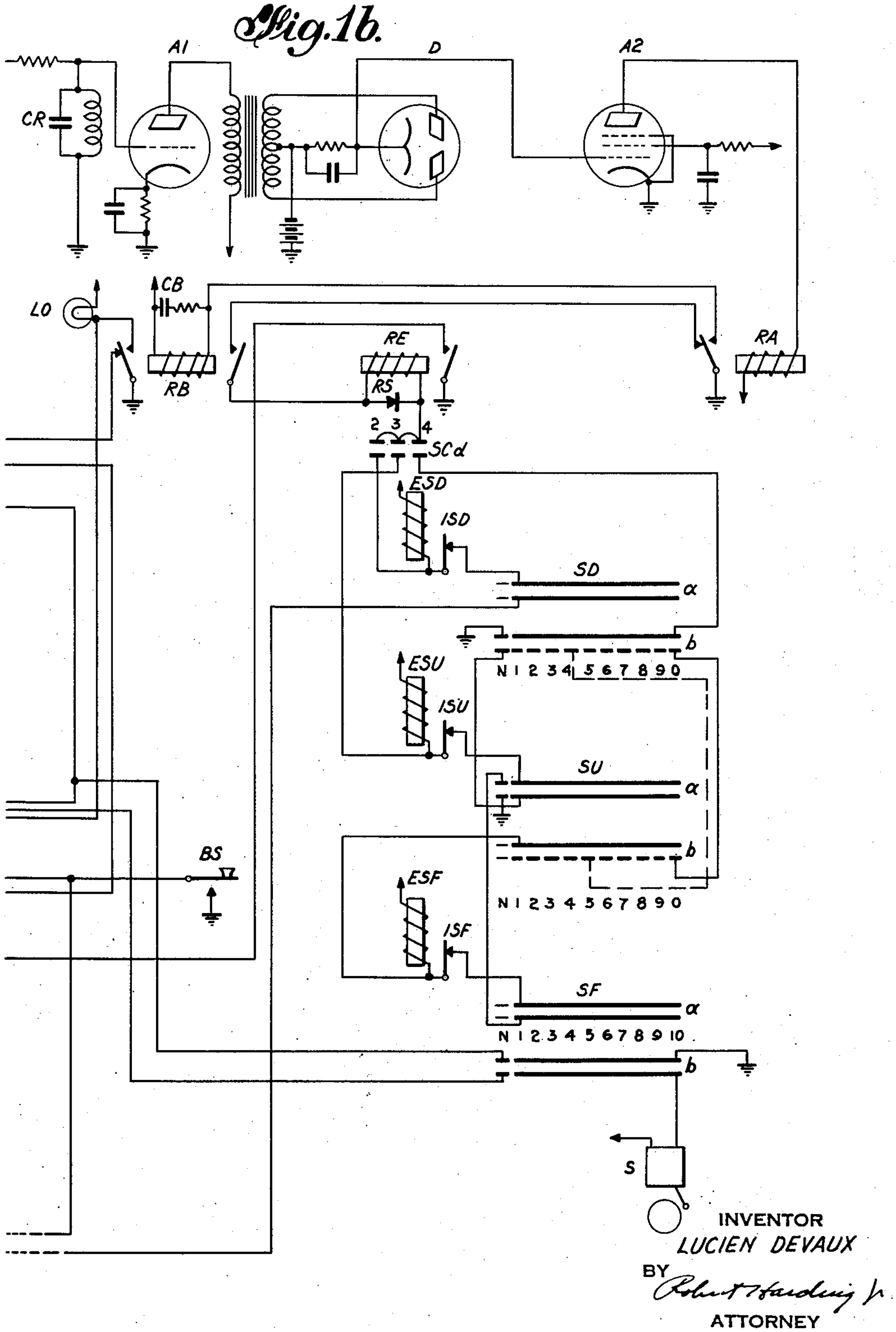

Figs. 1*a* and 1*b* of the drawing appended to the present description when placed side by side represent an overall schematic of an example of embodiment for association with a radiotelephone station consisting of transmitter TR and receiver RE, each provided with adjusting buttons for selecting the employed wavelength.

Referring to the drawing, the described example of embodiment essentially comprises the following members:

A radiotelephone transmitter TR with its microphone M, provided with a contact pedal P which serves both for closing the circuit of the microphone and for closing the circuit of a relay contained in the transmitter that serves for switching over the antenna from the receiver to the transmitter.

A radiotelephone receiver with its listening device R.

An oscillator OSC that generates a voice frequency modulation current.

An amplifier detector circuit comprising a resonant circuit CR, amplifier and detector tubes $A_1$, $A_2$, D, with transformer, resistances and condensers.

Six relays RA, RB, RC, RD, RE, RF, a key switch, condensers, etc.

A calling dial CA of the automatic telephone type.

Five 11-position step-by-step selectors represented by their contact banks and the electro magnets, each with its single or double interrupter. These selectors are as follows: selector of "tens" SD, selector of "units" SU, selector of frequencies SF, time limiter selector LT, and selector acting as sequence switch SC. For the first four selectors, the contact banks are shown in the vicinity of the corresponding electromagnet. For sequence switch SC, a certain number of contacts are shown at points away from the electromagnet in order to simplify the drawing, but these same contacts are also shown in the form of little blank rectangles in their normal position. The contacts not used are indicated by a thin dash. The method of showing the apparatuses is the customary one employed in telephony.

The electromagnets and the interrupters of the selectors are respectively indicated by the letters E and I followed by the letters indicating the selector to which they belong.

The operation of the system will be described on the assumption that the total number of stations that can communicate together is at most one hundred, and that ten frequencies can be employed. Each of the transmitters and receivers is accordingly provided with ten tuning adjustment buttons. From among these ten frequencies, one is reserved for call signals, and the other nine serve for exchanging conversations; this reserved frequency is No. 1, for example.

All the apparatuses are normally adjusted to this frequency. The receiver of each station is continuously active, but the transmitter is only set into operation during the calling and the conversation.

Assuming that one station wishes to call another station, say No. 45:

The operator has first to search for a free conversation frequency by listening-in and by depressing the buttons of the receiver; he notes the number of a frequency he has found to be free, e. g. frequency 7.

The operator sets the transmitter and the oscillator into operation, and he turns the calling dial CA to send the "tens" digit 4. As soon as the dial begins to turn, contacts CD*a* are closed and electromagnet ESC of the sequence switch is excited across its interrupter ISC*a*, contact $SCD_1$, contact CA*a* and the rest contact of RB. Sequence switch SC immediately passes to position 2. Contact CA*a* also closes the circuit of RC which operates and becomes blocked in operating position over its contact and contacts 2 to 10 of SC. RC also closes the circuit of ESC across 1SCa and contacts 2 to 4 of SCa. The sequence switch continues its movement and arrives at position 5.

At position 5 of SC, a contact of RC closes the circuit of RD across contacts 5 to 10 of SCf. RD cuts out microphone M and replaces it by oscillator OSC in order to modulate the wave transmitted by TR. A contact of RD excites the relay contained in transmitter TR in order to connect the transmitter to the antenna and cut out receiver RE, and RD also separates radio receiver RE from the signal operating circuit in order to prevent a local action. RD will remain pulled up as far as position 10 of SC.

Transmitter TR immediately sends a high frequency wave modulated at the low frequency of oscillator OSC. This wave is received by all the stations that have button 1 of the receiver depressed; it serves first of all for marking the occupation of the calling frequency. As will be explained further on, this results in the operation of the RA relays, and then of the RB relays, in all the stations, and the busy lamp 10 is lighted in all the stations. Furthermore, the circuit of RC is broken, so that no other station can make a call.

At position 5 of SC, the circuit of ESC is closed over 1SCb, SCa5, CAa and rest contact of RD. ESC pulls up its armature, and this opens 1SC, but ESC remains energized across resistance RSC, so that SC remains at position 5.

The return of the dial effects four interruptions of the modulation and, at the end of the movement, contact CAa opens; ESC releases and SC passes into position 6.

The operator sends the "units" digit 5 in similar manner and, at the finish, SC passes into position 7. The operator similarly sends the number of the frequency 7 that he has found to be free, and SC passes into position 8, but SC cannot remain at position 8, since the circuit of ESC is closed over 1SCa and SCb from 8 to 10. SC arrives at position 11 where it breaks the circuit of RC which releases and again closes the circuit of ESC over 1SCa and SCa and the rest contacts of RC and RB. SC returns to position 1.

Upon reaching position 11, SC no longer closes the circuit of RD which releases slowly, being retarded by condenser CD, so that the modulation still continues, e. g. for one second.

After having thus sent the number of the wanted station and indicated the conversation frequency to be employed, the calling operator presses down buttons 7 of the transmitter and the receiver, and listens in for an answer from the called station.

It is necessary to prevent a negligient operator from blocking the calling frequency by sending an incomplete call. The time at his disposal for sending the digits is accordingly limited by the time limiter selector LT.

As soon as SC reaches position 5, the circuit of ELT is closed over ILT, LTa1 and SCd5. LT immediately passes into position 2, and it begins to meter the time by setting retardation relay RF into operation, as will be described further on.

RF is a differential relay which has one of its windings $x$ in series with a high capacity condenser CF. When LT reaches position 2, it simultaneously closes the circuits of the two winding $x$ and $y$ across LTc2. Since condenser CF is not charged at the start, the currents are equal in $x$ and $y$, and RF is not energized because they act in opposite directions. It is even suitable for winding $x$ to be preponderant, but for the difference to be insufficient to cause the attraction of the armature. The current diminishes in $x$ in accordance with the charging of CF, and there arrives a moment when the current in $x$ is too weak to sufficiently diminish the excitation produced by $y$, and RF operates. It then closes the circuit of ELT, over ILT, LTb2 and operating contact of RF. LT passes into position 3 and the current is cut off in $x$ and $y$. CF then discharges into the two windings $x$ and $y$ in series, and RF remains pulled up for a long moment. When it falls back, its rest contact closes the circuit of ELT over ILT and LTb3. LT passes into position 4 where it again closes the circuit of $x$ and $y$.

The same operations are repeated, and LT passes slowly to the next positions as far as position 11 which it reaches in a time that is dependent on resistances $x$ and $y$ and on the capacitance of CF. This time may be fixed at 15 or 20 seconds, for example.

At position 11 of LT, the circuit of RSC is closed over ISC, SCb5, 6 or 7 depending upon the position at which the operator has stopped, and LTc11. SC immediately passes into position 8 and from there returns to position 1, as already explained, thus stopping the emission of modulated current.

If the operator has completed the call before LT reaches 11, SC will have arrived at 1 and it brings back LT to 1 by closing the circuit of ELT over ILT, LTa2 to 11 and SCa1. Similarly, LT passes from position 11 to position 1 when SC arrives at 1 after having been brought back there by LT.

The operation at the other stations will now be described. The wave modulated at the calling frequency is received by all the stations that have their receiver's No. 1 button pressed down.

The radio receiver delivers the modulation frequency to the signal receiving circuit. This wave is selected by a resonant circuit CR in series with a high resistance RR; it is amplified by a first tube LA1, detected by a tube ID, and the rectified voltage is applied to a pentode polarized below the cut-off point LA2 from which the plate circuit passes over relay RA. This relay operates immediately and closes the circuit of relay RB which operates without delay but which is shunted by a high capacity condenser CB for the purpose of making it slow to release, so that it remains pulled up during the interruptions of the modulation. RB closes the circuit of the busy lamp LO, and this indicates to all the stations that a call is in progress. Furthermore, RB breaks the circuit of contact CAa, so that if an operator of any station tried to make a call despite the indication of the busy lamp, he could not do so because relay RC would not operate. RB closes the circuit of ESC over ISCa and SCa1, and sequence switch SC passes into position 2 in all the stations in receiving position.

Upon the sending of the first digit, relay RA of all the stations in receiving position falls back at each interruption of the modulation. SC closes the circuit of ESD over ISD, RE, contact of RB and rest contact of RA. ESD pulls up its armature. RE is shunted by a dry rectifier RS which does not retard the relay when pulling up, but retards it when releasing. RE closes the circuit of ESC over ISCb, SCc2 and contact of RE. ESC pulls up its armature, and this opens contact ISC*b*, but the attraction persists because the circuit of ESC remains closed across resistance RSC, so that the selector does not rotate.

After the first interruption, when the modulation sets in again, AR is again excited; ESD releases and SD leaves its normal position N and arrives at position 1. RE remains pulled up during the interval between two interruptions of the modulation.

The second interruption of the modulation causes SD to pass into position 2, and so on as far as position 4.

The calling operator then sends the digit 5. A sufficient time interval elapses between the sending of the digit 4 and that of the next digit 5 for RE to release, and this opens the circuit of ESC; SC passes into position 3.

In this position of SC, ESD is cut out and is replaced by ESU. The 5 interruptions of the calling dial cause SU to pass into position 5, and RE is again in the operating position. At the finish of the train of interruptions, RE falls back and causes SC to pass into position 4.

The calling operator then sends the number of the frequency he has found to be free, i. e. 7.

Selectors SD and SU of all the stations have accordingly been brought to positions 4 and 5 respectively, but only the station bearing No. 45 has a connection (indicated in dotted lines) between contact 4 of bank *b* of SD and contact 5 of bank *b* of SU. This connection serves for closing the circuit between the rest contact of RA and ESF, so that only selector SF of station 45 will rotate for the interruptions sent. SF, upon leaving the normal position N, accordingly reaches position 7.

As soon as SF leaves position N, it closes the circuit of bell S to contact bank *b*; station 45 is accordingly rung.

Selector SF carries a numbered drum which appears behind a window of the apparatus to indicate to the operator of the called station the number of the frequency to be used for the conversation.

Upon termination of the sending of the number of the frequency to be employed, SC passes into position 5 through the falling back of the armature of RA.

As soon as the three digits that make up the call sign have been sent, and SC of the called station has reached position 5, the circuit of ELT is closed over LT1 and SC*d*5. LT begins to rotate, as already explained, and it meters the time so that if the operator of the called station does not answer, the apparatuses will be brought back to the resting position at the end of a certain time, as already explained.

The operator of the called station notes the number of the conversation frequency, 7 in the selected example; he presses down buttons 7 of the transmitter and the receiver, answers and stops the ringing by momentarily depressing button BS, thus closing the circuit of ESC over ISC*a*, SC*b*5 to 7, and the button's contact. SC immediately passes into position 8, and from there into position 11, and when the transmission of the modulation stops, RB falls back a moment later and SC returns to position 1, as already explained.

At position 1, SC closes the circuit of ELT over ILT, LT*a*2 to 11 and SC*c*1. LT returns to position 1 in which it closes the circuit of ESD over ISD, SD*a*1 to 0, LT*a*1 and SC*c*1. SD returns to its normal position in which it closes the circuit of ESD over ISD, SD*a*1 to 0, LT*a*1 and SC*c*1. SD returns to its normal position in which it closes the circuit of ESU over ISU, SU*a*1 to 0, and SDN. SU returns to its normal position in which, in its turn, it closes the circuit of ESF over ISF, SF*a*1 to 10, and SU*a*N. SF returns to its normal position, the ringing circuit is cut out, and all the apparatuses return to the resting position.

In case of no answer, LT reaches position 11 in which it closes the circuit of ESC over ISC*c*5 to 8. SC returns to position 1, as already explained, and it then successively brings the other selectors to the resting position.

In the stations that have not been called, SC has remained at position 4. A moment after the transmission of the modulated wave has ceased, RB releases and closes the circuit of ESC over ISC*a*, SC*a*4 and the rest contacts of RC and RB. SC passes into position 5 in which the circuit of ESC is closed over ISC*a*, SC*a*5, SF*b*N, and the rest contacts of RC and RB. SC passes into position 6 and from there it returns to position 1 in which it brings SD and SU to the resting position, as already explained.

Upon termination of the conversation, the only manipulation the operators have to make is that of pressing down the adjustment keys of the transmitter and the receiver to the frequency 1, so that the stations may be in position to receive a call.

The system is applicable to the simultaneous calling of all the stations or of a group of stations. For example, the drawings show the arrangement that serves for calling all the stations by means of the call sign 00. It is sufficient to make a direct connection between SD*b*0 and SU*b*0. By sending zero twice, the two selectors SD and SU of all the stations are brought to the position 0 and the circuit of SF is closed to all the stations, so that the third digit indicating the conversation frequency is received by all the stations on selector SF. Other numbers may be reserved for groups of stations.

A number of apparatuses in excess of one hundred may be provided with the same system by adding a selector for the "hundreds."

The circuits described above are capable of numerous variants without departing from the scope of the invention.

What is claimed is:

1. In a telephone exchange system, a plurality of stations, a variably tunable radio receiver and transmitter for each station, means for rendering the transmitter active during signalling and conversation, electrical potential sources of a plurality of different frequencies, means at each station for selecting an idle one of said frequencies for communication, a normally inactive station selector at each station for determining the selection of its station, means including a first relay at each station for controlling the connection for operation of the transmitter and receiver thereof, and for controlling the operation of a station selector in a called station, a second relay at each station, means for operating the second relay at each station whose receiver responds to a frequency selected and transmitted by the calling station, means controlled by the operated second relay for controlling the associated circuit of the first relay of the same station to prevent the initiation of a call from a station whose receiver has responded, a multi-position switch at each station, means for moving the switch at the calling station from position to position in response to the operation of a control for a station selector, means including a time limiter at each station for limiting the time during which the operation of a station selector may be controlled at the calling station, means controlled by the time limiter for returning the multi-position switch to normal position if within a predetermined time it does not pass through certain positions, and means controlled by the multi-position switch for returning the time limiter to normal if the operation of the station selector is completed within a predetermined period.

2. The system according to claim 1, and means at each station operable at will for restoring to normal the multi-position switch thereat.

3. In a telephone exchange system, a plurality of stations, a variably tunable radio receiver and transmitter at each station, the receiver being normally active and the transmitter normally inactive, means including contacts for rendering the transmitter active during signaling and conversation, a microphone and an oscillator for each transmitter, electrical potential sources of a plurality of different frequencies, means at each station for selecting an idle one of said frequencies for conversation and a predetermined one of the frequencies for signaling, a normally inactive calling dial at each station, a normally inactive multi-position sequence switch at each station, means for moving the sequence switch into its first operating position responsive to the operation of the associated dial at the same station, a first relay at each station having an energizing circuit closed by the sequence switch from the first to the last position thereof for controlling said contacts and for disconnecting the microphone of the associated transmitter, and connecting in its place the oscillator, and also for disconnecting the receiver, a quick acting second and a slow acting third relay at each station, means for operating the second and third relays at each station whose receiver responds to a frequency selected and transmitted by the calling station, a busy lamp at each station controlled by the third relay, each third relay controlling the energizing circuit of the first relay at that station to prevent the initiation of a call from a station whose receiver has responded, and means for moving the sequence switch at the calling station from position-to-position in response to the operation of the dial in accordance with successive digits designating the called station and finally the digit designating the frequency selected at the calling station.

4. The system according to claim 3, means including at each station a time limiter for limiting the time during which digits may be sent from the calling station and the called station may be signalled, a circuit controlled by the time limiter for returning the sequence switch of the calling station to normal position if within a predetermined length of time it does not pass through the digit sending positions, means controlled by the sequence switch for returning the associated time limiter to normal if digit sending is completed within a predetermined period, and an answering key at each station for moving the sequence switch thereat into normal position from an operating position.

5. The system according to claim 4, and a differential retardation relay operatively associated with each time limiter cooperating in the control of the associated time limiter and sequence switch.

6. The system according to claim 3, a circuit for moving the sequence switch into second position at all stations whose third relay operates, a plurality of multi-position digit switches at each station, and circuits controlled by the sequence switches at the last mentioned stations for moving the digit switches into positions determined by the quick acting second relay which responds to each digit pulse.

7. The system according to claim 6, a normally inactive multi-position frequency indicator at each station, a circuit for operating the frequency indicator only at the called station, said circuit being jointly controlled by the digit switches and the second and third relays of the called station, and a signal at each station operated in all off-normal positions of the frequency selector of that station.

8. The system according to claim 7, circuits for returning to normal positions the digit switches and frequency indicator at the called station when the sequence switch at the called station is returned to normal, and circuits for returning to normal the operated digit switches at other stations than the called one jointly controlled by the third relay and sequence switch thereat.

9. In a telephone exchange system, a plurality of stations, a variably tunable radio receiver and transmitter for each station, means for rendering the transmitter active during signalling and conversation, electrical potential sources of a plurality of different frequencies, means at each station for selecting an idle one of said frequencies for communication, a normally inactive station selector at each station for determining the selection of its station, means including a first relay at each station for controlling the connection for operation of the transmitter and receiver thereof, and for controlling the operation of a station selector in a called station, a second relay at each station, means for operating the second relay at each station whose receiver responds to a frequency selected and transmitted by the calling station, means controlled by the operated second relay for controlling the associated circuit of the first relay of the same station to prevent the initiation of a call from a station whose receiver has responded, a plurality of multi-position digit switches at each station, means controlled by the second relay at each called station for moving the digit switches in the positions determined by the station selector control at the calling station, a normally inactive multi-position frequency indicator at each station, and means controlled by the digit switches for operating the frequency indicator only at the called station selected by the station selector control.

LUCIEN DEVAUX.

REFERENCES CITED

The following references are of record in the file of this patent:

UNITED STATES PATENTS

| Number | Name | Date |
|---|---|---|
| 1,608,551 | Demarest et al. | Nov. 30, 1926 |
| 2,061,699 | Fox | Nov. 24, 1936 |
| 2,064,894 | Espenschied | Dec. 22, 1936 |
| 2,064,961 | Tidd | Dec. 22, 1936 |
| 2,101,668 | Bishop et al. | Dec. 7, 1937 |
| 2,137,023 | Monk | Nov. 15, 1938 |
| 2,176,868 | Boswau | Oct. 24, 1939 |
| 2,226,692 | Brunner | Dec. 31, 1940 |
| 2,265,056 | Bowers | Dec. 2, 1941 |
| 2,363,583 | Gilman | Nov. 28, 1944 |
| 2,383,908 | Bowers | Aug. 28, 1945 |